United States Patent [19]

Penn

[11] Patent Number: 4,506,870
[45] Date of Patent: Mar. 26, 1985

[54] COMBINED TRUCK BED STORAGE COMPARTMENT AND SPOILER

[76] Inventor: William Penn, 1701 Nina St., Columbus, Ga. 31906

[21] Appl. No.: 535,811

[22] Filed: Sep. 26, 1983

[51] Int. Cl.³ .............................................. B62D 35/00
[52] U.S. Cl. .................................. 296/1 S; 296/24 R; 296/37.6; 224/42.42
[58] Field of Search ................... 296/24 R, 57 R, 1 S, 296/37.6; 224/42.42 R

[56] References Cited

U.S. PATENT DOCUMENTS 4,215,896  8/1980  Drouin .............................. 296/37.6
4,451,075  5/1984  Canfield ........................... 296/37.6

Primary Examiner—Robert R. Song
Attorney, Agent, or Firm—Newton, Hopkins & Ormsby

[57] ABSTRACT

A hinged inclined panel in cooperation with the tailgate and two side walls of a truck bed form a secure storage compartment within the truck bed which conceals articles therein. The inclined panel acts as a spoiler by reducing air drag normally caused by the upright tailgate. A secure locking means for the hinged panel is provided.

9 Claims, 8 Drawing Figures

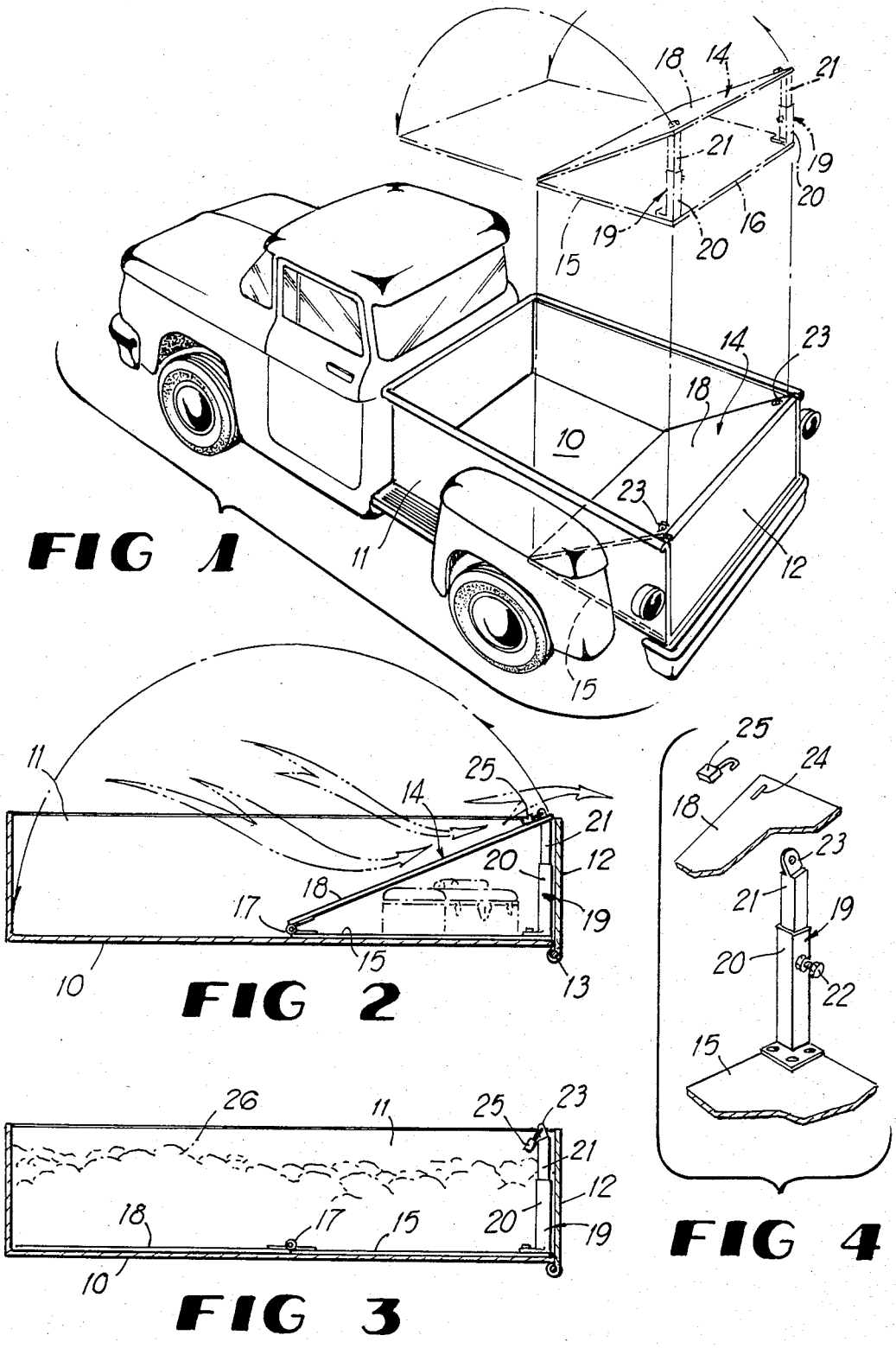

COMBINED TRUCK BED STORAGE COMPARTMENT AND SPOILER

BACKGROUND OF THE INVENTION

A need exists for a simplified, convenient and inexpensive article storage and concealing compartment for the bodies or beds of trucks, such as pickup trucks. While some such devices are known in the prior art, as exemplified by U.S. Pat. No. 4,215,896, the prior art devices tend to be costly, heavy and frequently require the drilling of holes in the truck bed or other structural modifications thereof to accommodate the compartment means.

In contrast to the prior art, the instant invention provides a highly simplified, low cost compartment means for a truck bed which includes an inclined top panel which rises to the level of the top edge of the tailgate of the truck bed and serves the dual purpose of acting as a spoiler to reduce air drag normally caused by the upright tailgate.

Also, according to the invention, the tailgate is utilized as the rear closure of the storage compartment, and the truck bed side walls serve as closures for the opposite sides of the compartment.

In essence, the concealed article storage compartment and spoiler is formed by a single hinged panel attached to a bed plate or panel on which is mounted a pair of opposite side upstanding lock posts which enable locking the inclined hinged panel securely by padlocks or the like in the article concealing and protecting position. No structural modification of the truck bed or body whatsoever is required for the acceptance of the combined device.

Other features and advantages of the invention will become apparent during the course of the following description.

BRIEF DESCRIPTION OF THE DRAWINGS

FIG. 1 is a perspective view of a combined truck bed storage compartment and spoiler according to the invention, the invention being shown separated from the truck bed in phantom lines.

FIG. 2 is a side elevation of the storage compartment and spoiler with the truck bed in cross section.

FIG. 3 is a view similar to FIG. 2 with the device of the invention in a second operative position within the truck bed.

FIG. 4 is a fragmentary exploded perspective view of an adjustable lock post and associated elements of the invention.

DETAILED DESCRIPTION

Figure 5:
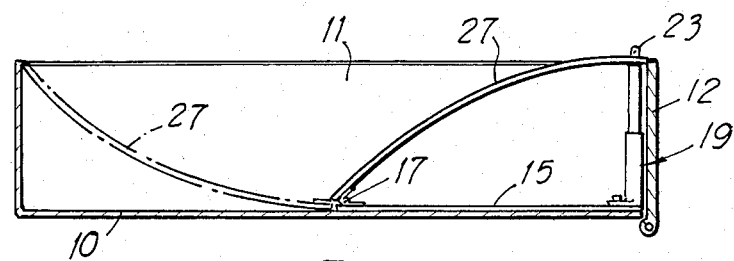
FIGS. 5 through 8 are a series of side elevational views depicting variants of the invention.

Referring to the drawings in detail wherein like numerals designate like parts, one preferred form of the invention is shown in FIGS. 1-4. In these figures, a pickup truck is illustrated having a truck bed or body including a horizontal floor 10, opposing vertical side walls 11 and a rear tailgate 12 which is vertically swingable on a lower transverse horizontal axis hinge 13. A combined truck bed storage compartment and spoiler 14 forming the subject matter of this invention consists of a flat bed plate or panel 15 which may rest removably on the floor 10 or be fixed thereto permanently, if preferred. The bed plate 15 spans substantially the entire distance between the two side walls 11 and preferably extends for approximately one-half of the length of the floor 10. The rear edge 16 of the bed plate is disposed substantially in registration with the rear edge of the truck bed floor 10.

Hinged to the forward edge of bed plate 15 by a horizontal transverse axis hinge 17 is a swingable top closure panel 18 of the combined storage compartment and spoiler 14. The panel 18 is of the same width as the bed plate 15 and has approximately the same length as the bed plate, whereby the two panels 15 and 18 when positioned in a common horizontal plane, FIG. 3, will cover substantially the entire truck bed floor 10.

Fixed to the rear corners of bed plate 15 is a pair of upstanding rigid lock posts 19, preferably formed in two telescopically adjustable interfitting sections 20 and 21, held in selected adjusted positions by a locking set screw 22, or by equivalent means. Each upper post section 21 carries a top apertured lug 23 engageable through a slot 24 near each rear corner of the top closure panel 18. Padlock shackles 25 can be placed through the apertured lugs 23 above the closure panel 18 to lock the rear end of the closure panel to the tops of posts 19.

In the security closure forming position shown in FIGS. 1 and 2, the panel 18 is inclined at an angle of approximately 30° to the floor 10 and bed plate 15, and rises from the hinge 17 rearwardly so that the rear edge of the panel 18 is in substantial registration with the top edge of the tailgate 12 when the latter is vertically positioned. The tailgate 12 forms the rear closure element of the storage compartment formed by panels 15 and 18 with the two side walls 11. The storage compartment is wedge-shaped and forwardly tapering. The inclined panel 18 serves the second purpose in the invention of an air drag reducer or spoiler as graphically depicted by the airstream arrows in FIG. 2 which are being deflected by the inclined panel or spoiler. Otherwise, the upright tailgate 12 would trap the airstream flowing downwardly from the cab roof of the truck and cause a pronounced drag effect, lessening fuel economy.

When the closure panel 18 is unlocked from the posts 19 and swung forwardly to the horizontal position shown in FIG. 3 where it lies in a common plane with the bed plate or panel 15, a load 26 of material may be transported in the truck bed without necessitating removal of the combined compartment forming means and spoiler.

The device is characterized by extreme simplicity, convenience and versatility of use, and low cost of manufacturing. The elements 15 and 18 can be formed of plywood, plastics or metal. The structure is strong and durable. It is also much simpler than prior art devices typified by the previously-referenced United States patent.

FIG. 5 shows a first variant of the invention, wherein the inclined top closure panel and spoiler 27 can be a curved plate member instead of flat. All other parts and their functions remain as previously described.

Figure 6:
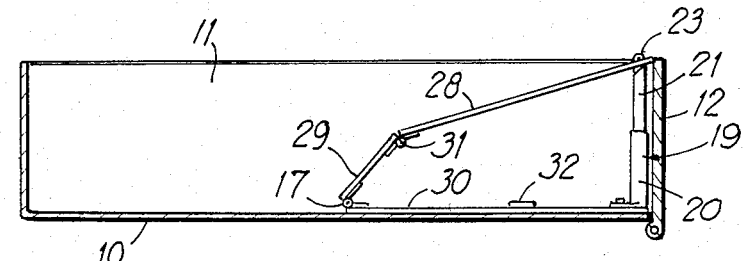

A second variant of the invention is shown in FIG. 6, wherein the top closure of the storage compartment is formed by two hinged panel sections 28 and 29 rather than by a single panel. The panel section 29 is substantially shorter than the section 28 and assumes a steeper angle of inclination than the panel section 28 in the compartment forming position. The smaller panel section 29 is connected to a bed plate 30 by hinge 17 and to the panel section 28 by another hinge 31.

Figure 7:
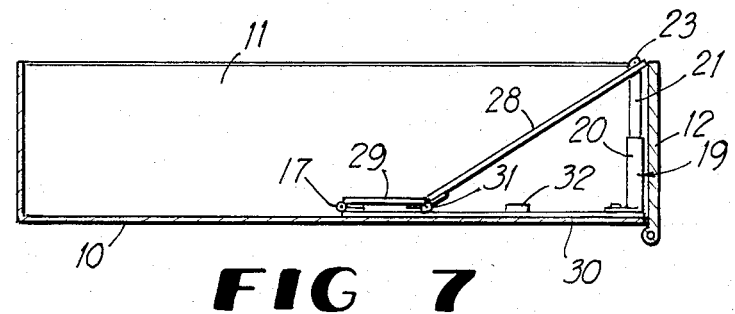

FIG. 7 shows another variant which is structurally similar to the arrangement in FIG. 6, except for the fact that the two panel sections 28 and 29 break downwardly relative to the axis of hinge 31 instead of upwardly in the compartment forming positions.

Figure 8:
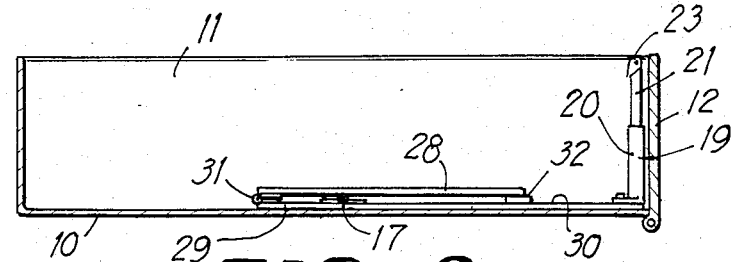

FIG. 8 reveals how the compartment forming and spoiler device of FIGS. 6 or 7 can be folded flat on the floor 10 of the truck bed. The bed plate 30 remains in place on the floor 10. The smaller panel 29 is revolved rearwardly around the hinge 17 to lie flat on the floor 10 behind the bed plate 30 and the larger panel section 28 can then lie flat closely above the elements 29 and 30, resting on hinge 17 and a rest pad 32 fixed to the bed plate 30.

All of the variants of the invention shown in FIGS. 5 to 8 serve substantially the same dual purpose as the combined device in FIGS. 1 through 4.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A combined storage compartment and spoiler for a truck bed having a tailgate and substantially vertical side walls, said combined device comprising at least a hinged panel section on the floor of a truck bed and being adapted to assume an inclined position above the truck bed whereby the panel section forms a spoiler and simultaneously forms a top closure member for a storage compartment whose sides are formed by the truck bed side walls and whose rear wall is formed by the truck bed tailgate, means to releasably lock the panel section in said inclined position, and a bed plate hingedly connected with said panel section on a transverse axis hinge and adapted to rest on the floor of a truck bed, and said means to lock the panel section being secured to and rising from the bed plate near the rear end thereof.

2. A combined storage compartment and spoiler for a truck bed as defined in claim 1, and said means to lock said panel section comprising a pair of upright lock posts on the rear corners of the bed plate and having top apertured lugs, the rear corners of said panel section having slots receiving the apertured lugs, and locking devices insertable through the apertured lugs above the top face of the panel section.

3. A combined storage compartment and spoiler for a truck bed as defined in claim 1, and said hinged panel section comprising a unitary substantially flat panel section.

4. A combined storage compartment and spoiler for a truck bed as defined in claim 1, wherein said hinged panel section comprises an arcuate upwardly bowed panel section.

5. A combined storage compartment and spoiler for a truck bed as defined in claim 1, and said hinged panel section being articulated on a transverse axis between its ends.

6. A combined storage compartment and spoiler for a truck bed as defined in claim 1, and the hinged panel section when in said inclined position having its rear transverse edge substantially in registration with the upper edge of said tailgate to form therewith and with said side walls a forwardly tapering substantially right triangular wedge shaped storage compartment.

7. A combined storage compartment and spoiler for a truck bed as defined in claim 1, and said bed plate and hinged panel section having a combined length when in a common horizontal plane to cover substantially the floor of a truck bed.

8. A combined storage compartment forming device and spoiler for placement in a truck bed between the side walls thereof and immediately forwardly of the truck bed tailgate, said combined device comprising a bed plate adapted to rest on the floor of a truck bed forwardly of the tailgate, a vertically swingable closure panel hinged to the forward end of the bed plate on a horizontal transverse hinge axis, the closure panel being adapted to assume an inclined rearwardly rising position above the bed plate with its rear transverse edge disposed substantially at the level of the tailgate top edge, the bed plate and said closure panel being of the same width and spanning substantially the entire distance between the side walls of a truck bed in which the device is placed, and means to releasably lock said closure panel in said inclined position.

9. A combined storage compartment forming device and spoiler as defined in claim 8, and said means comprising at least a locking post on and rising from the rear end portion of the bed plate and having cooperative locking engagement with the rear end portion of said closure panel.

* * * * *